United States Patent
Clerckx et al.

(10) Patent No.: US 8,160,125 B2
(45) Date of Patent: Apr. 17, 2012

(54) SYSTEM FOR FEEDING BACK INDEX OF CODEWORD MATRIX

(75) Inventors: Bruno Clerckx, Yongin-si (KR); Sung Jin Kim, Suwon-si (KR); Ki Il Kim, Seongnam-si (KR); David J. Love, West Lafayette, IN (US); Taejoon Kim, West Lafayette, IN (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 997 days.

(21) Appl. No.: 12/109,440

(22) Filed: Apr. 25, 2008

(65) Prior Publication Data

US 2009/0268827 A1   Oct. 29, 2009

(51) Int. Cl.
H04B 1/38 (2006.01)
H04B 7/02 (2006.01)
H04L 1/02 (2006.01)

(52) U.S. Cl. .................. 375/219; 375/267
(58) Field of Classification Search .......... 375/219, 375/260, 267, 299; 455/39, 500, 519, 69, 455/73, 561, 562.1
See application file for complete search history.

(56) References Cited

U.S. PATENT DOCUMENTS

2009/0080549 A1*  3/2009  Khan et al. ............... 375/260

* cited by examiner

*Primary Examiner* — Betsy Deppe
(74) *Attorney, Agent, or Firm* — NSIP Law

(57) ABSTRACT

A system is provided for performing downlink beamforming based on information fed back by a mobile station. The mobile station includes a channel matrix generation unit to generate a channel matrix with respect to channels ranging from a base station to a mobile station, the base station including multiple transmission antennas, a codebook updating unit to generate a second codebook including a plurality of second codeword matrixes based on the generated channel matrix and a first codebook including a plurality of first codeword matrixes, a codeword selection unit to select at least one transmission codeword matrix from among the plurality of second codeword matrixes, a transmission unit to transmit an index of the selected transmission codeword matrix to the base station, and a receiving unit to receive data transmitted from the base station via the multiple transmission antennas.

18 Claims, 8 Drawing Sheets

SYSTEM FOR FEEDING BACK INDEX OF CODEWORD MATRIX

TECHNICAL FIELD

The following description relates to a multiple antenna transmission system, and more particularly, to a system for performing downlink beamforming based on information fed back by a mobile station.

BACKGROUND

Currently, radio communication technologies for providing various multi media services in a radio communication environment have been developed. A high transmission rate is required to provide multi media services having a relatively high quality. Thus, various studies for supporting the high transmission rate have been recently made. Of theses, a study for a Multiple Input Multiple Output (MIMO) technology has been actively made.

The MIMO technology may increase a channel capacity within limited frequency resources by using multiple antennas. The MIMO technology may use multiple antennas in the case of a superior scattering environment, and thus providing a channel capacity in proportion to a number of antennas, in theory.

However, in the MIMO technology, a space and area in which antennas are able to be installed may be limited, and intervals between the antennas may adversely affect a communication performance. Specifically, radio channels may have a higher correlation therebetween along with a reduction in the interval between the antennas. In particular, the radio channels have a significantly high correlation therebetween in the case of antennas having an identical polarization. Interference generated between the radio channels may decrease reliability of data communication, and also decrease the transmission rate.

The MIMO technology is required to perform an operation for coding data in advance for the purpose of effective transmission of data, which refers to precoding. Also, a scheme in which a rule for precoding data is expressed as a matrix refers to as a precoding matrix, and further a set of the precoding matrixes refers to as a codebook.

A base station may precode data based on information about a channel state from the base station to a mobile station, and transmit the precoded data to the mobile station. The mobile station may estimate the channel state from the base station to the mobile station, and feed back information about the estimated channel state to the base station. In order to increase a precoding performance, the mobile station is required to transmit more accurate information about the channel state, however, a data transmission capacity from the mobile station to the base station is limited, which results in causing difficulties in transmission of accurate information.

SUMMARY

According to an aspect, there is provided a system which reduces an amount of information fed back to a base station by a mobile station in order to perform downlink beamforming.

According to another aspect, there is provided a system which transmits data to a mobile station based on an index of a codeword matrix fed back by the mobile station.

According to still another aspect, there is provided a system which updates a codebook according to change in channels from a base station to a mobile station.

According to yet another aspect, there is provided a mobile station, which includes: a channel matrix generation unit to generate a channel matrix with respect to channels ranging from a base station to a mobile station, the base station including multiple transmission antennas; a codebook updating unit to generate a second codebook including a plurality of second codeword matrixes based on the generated channel matrix and a first codebook including a plurality of first codeword matrixes; a codeword selection unit to select at least one transmission codeword matrix from among the plurality of second codeword matrixes; a transmission unit to transmit an index of the selected transmission codeword matrix to the base station; and a receiving unit to receive data transmitted from the base station via the multiple transmission antennas based on the transmitted index.

According to still yet another aspect, there is provided a base station device, which includes: a transmission unit to include multiple transmission antennas; a codebook updating unit to generate a second codebook including a plurality of second codeword matrixes based on a channel matrix with respect to channels ranging from the multiple transmission antennas to a mobile station connected with the base station and a first codebook including a plurality of first codeword matrixes; a receiving unit to receive, from the mobile station, an index of at least one codeword matrix from among the plurality of second codeword matrixes; and a transmission unit to transmit data to the mobile station via the multiple transmission antennas based on the second codeword matrix corresponding to the received index.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures unless described to the contrary in the corresponding description.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
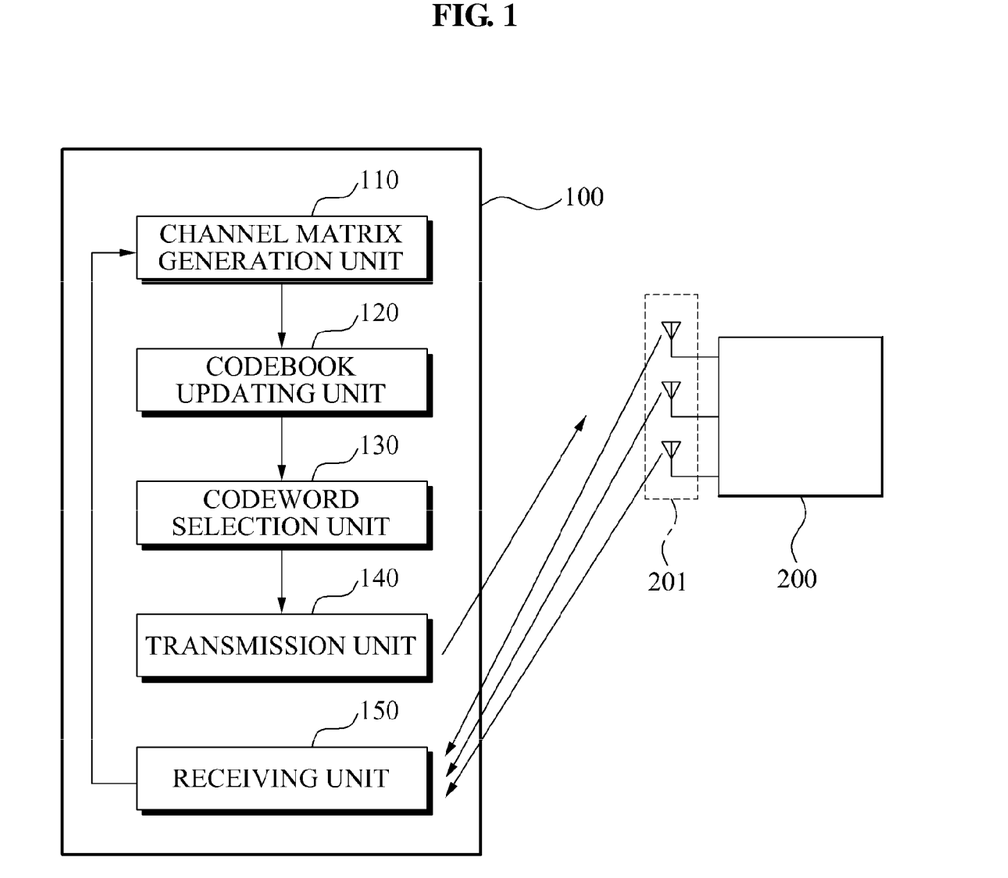
FIG. 1 is a block diagram illustrating a structure of a mobile station which transmits an index of a codeword matrix according to an exemplary embodiment.

FIG. 1 is a block diagram illustrating a structure of a mobile station 100 which transmits an index of a codeword matrix according to an exemplary embodiment. Hereinafter, operations of the mobile station 100 according to an exemplary embodiment will be described with reference to FIG. 1. The mobile station 100 includes a channel matrix generation unit 110, a codebook updating unit 120, a codeword selection unit 130, a transmission unit 140, and a receiving unit 150.

The channel matrix generation unit 110 generates a channel matrix with respect to channels ranging from the base station 200 to the mobile station 100. The base station 200 may include M transmission antennas 201, and the mobile station 100 may include N receiving antennas. In this case, the channel matrix has a size of M*N. According to another exemplary embodiment, the mobile station 100 may include a single receiving antenna. In this case, the channel matrix has a size of M*1.

The base station 200 may transmit a plurality of pilot signals to the mobile station 100 using the multiple transmission antennas 201. The mobile station 100 may estimate the channels ranging from the base station 200 to the mobile station 100 based on the plurality of pilot signals, and generate a channel matrix.

According to an aspect, the plurality of pilot signals transmitted by the base station 200 may be orthogonal to each other.

The codebook updating unit 120 generates a second codebook based on a first codebook and the channel matrix. In this instance, the first codebook and the second codebooks are matrix sets including a plurality of matrixes. The first codebook includes a plurality of first codeword matrixes, and the second codebook includes a plurality of second codeword matrixes. A number of the first codeword matrixes included in the first codebook and a number of the second codeword matrixes included in the second codebook are the same.

According to an aspect, the mobile station 100 and base station 200 may include an identical codebook. The mobile station 100 and the base station 200 may include an identical codebook, and generate an identical second codebook based on the first codebook. The mobile station 100 may transmit information on channels ranging from the base station 200 to the mobile station 100 to the base station 200, and the base station 200 may generate the second codebook identical to that of the mobile station 100 based on information on the received channel.

The codeword selection unit 130 selects at least one transmission codeword matrix from among the plurality of second codeword matrixes included in the second codebook. The codeword selection unit 130 may select a transmission codeword matrix, so that a transmission rate of data received by the mobile station 100 can be maximized.

The transmission unit 140 transmits an index of the selected transmission codeword matrix to the base station 200. In this instance, the index of the transmission codeword matrix indicates an order that a code word matrix being positioned within the second codebook is selected as the transmission codeword matrix.

According to an aspect, the mobile station 100 and the base station 200 may include an identical codebook. Thus, when the mobile station 100 transmits only an index of the transmission codeword matrix to the base station 200, the base station 200 may acquire all information with respect to the transmission codeword matrix selected by the mobile station 100.

The base station 200 may transmit data to the mobile station 100 via the multiple transmission antennas 201 based on the index transmitted by the transmission unit 140.

The receiving unit 150 receives data transmitted from the base station 200.

Figure 2:
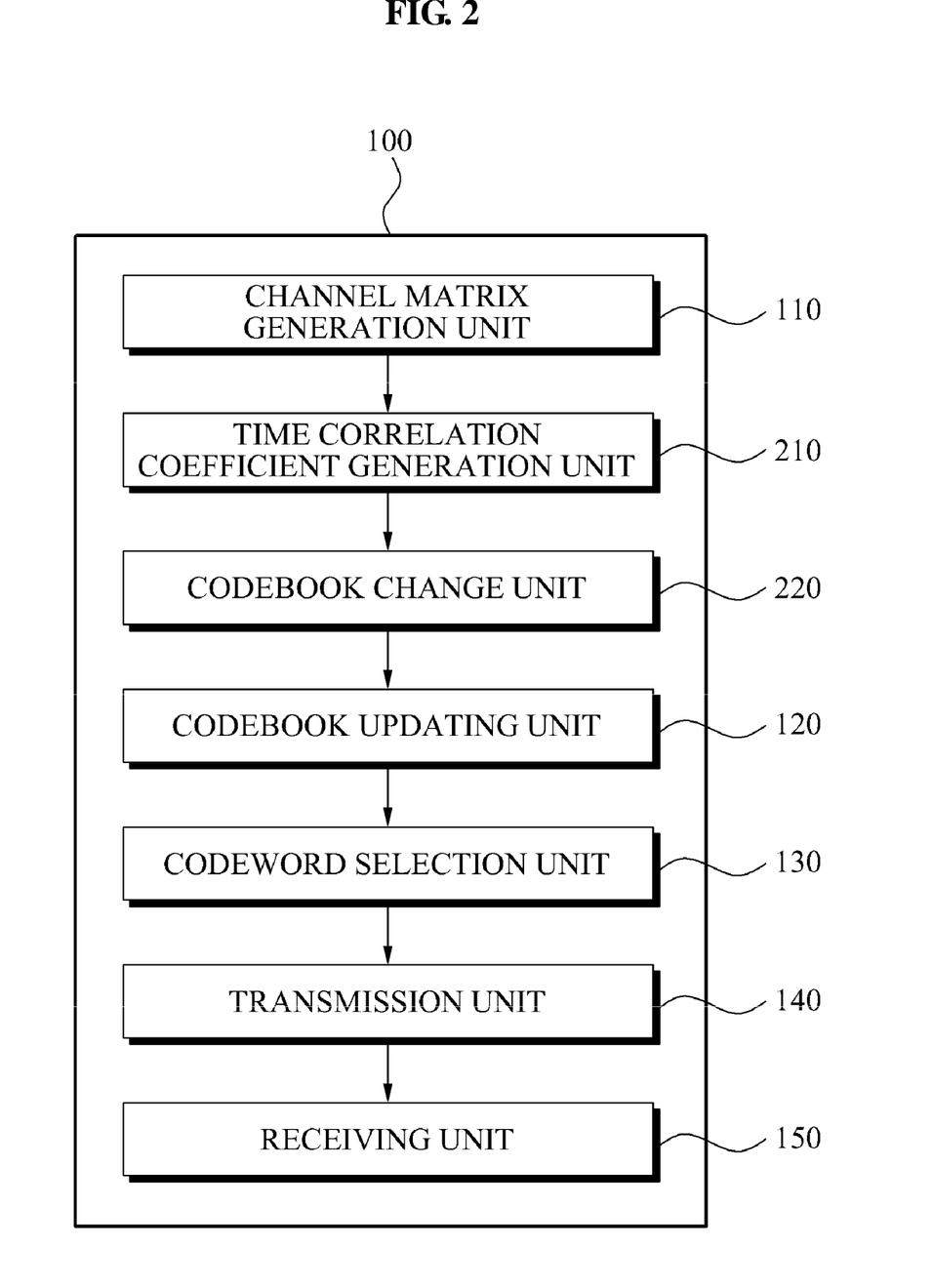
FIG. 2 is a block diagram illustrating a structure of a mobile station which updates a codebook based on a time correlation coefficient according to an exemplary embodiment.

FIG. 2 is a block diagram illustrating a structure of a mobile station 100 which updates a codebook based on a time correlation coefficient according to an exemplary embodiment. Hereinafter, operations of the mobile station 100 according to an exemplary embodiment will be described with reference to FIG. 2. The mobile station 100 includes a channel matrix generation unit 110, a time correlation coefficient generation unit 210, a codebook change unit 220, and a codebook updating unit 120.

The channel matrix generation unit 110 may generate a channel matrix with respect to channels ranging from the base station 200 and the mobile station 100 for each time interval having a predetermined length.

The time correlation coefficient generation unit 210 generates a time correlation coefficient by comparing a first channel matrix generated in a specific time interval and a second channel matrix generated in another time interval adjacent to the specific time interval.

The time correlation coefficient generation unit 210 may generate a time correlation coefficient based on a channel model with respect to the channels ranging from the base station 200 to the mobile station 100.

According to an aspect, in the case of a single mobile station being connected with the base station 200, the time correlation coefficient generation unit 210 may model the channels ranging from the base station 200 to the mobile station 100 according to $$H_\tau = \rho \cdot H_{\tau-1} + \Delta, \qquad \text{[Equation 1]}$$

wherein $H_\tau$ denotes a channel matrix generated at a τ-th time interval, ρ denotes a time correlation coefficient which is greater than '0' and less than '1'. Δ denotes a conjugate noise varying according to a regular distribution whose mean is '0' and whose variance is $1-\rho^1$. When M transmission antennas and N receiving antennas are installed in the base station and the mobile station, respectively, $H_\tau$ denotes a matrix having a size of M*N.

According to another aspect, in the case of a plurality of mobile stations being connected with the base station 200, the time correlation coefficient generation unit 210 may model the channels ranging from the base station 200 to the mobile station 100 according to $$h_\tau = \rho \cdot h_{\tau-1} + \sqrt{1-\rho^2} \cdot w_\tau, \qquad \text{[Equation 2]}$$

wherein $h_\tau$ denotes a channel matrix generated at a τ-th time interval. A plurality of mobile stations 100 including only a single receiving antenna may be connected with the base station 200 including M transmission antennas. In this case, $h_\tau$ denotes a vector having a size of M*1, and $w_\tau$ denotes a noise vector having a size of M*1, which varies according to a regular distribution whose mean is '0', and whose variance is '1'. According to another aspect, the mobile station 100 including N receiving antennas may be connectable with the base station 200 including M transmission antennas. In this case, $w_\tau$ denotes a noise matrix having a size of M*N.

The codebook updating unit 120 may update the second codebook based on ρ of a time correlation coefficient.

The transmission unit 140 may transmit the generated time correlation coefficient to the base station 200. The base station 200 may generate the second codebook based on the received time correlation coefficient and the first codebook of the base station 200. When the first codebook of the base station 200 and the first codebook of the mobile station 100 are the same, and the base station 200 receives the time correlation coefficient transmitted by the mobile station 100, the second codebook of the mobile station 100 and the second codebook of the base station 200, each generated based on the first codebook and the time correlation coefficient, are the same.

The base station 200 may transmit data using the second codebook of the base station 200 which is identical to the second codebook of the mobile station 100, and the mobile station 100 may receive the transmitted data.

The codebook updating unit may compare a first time correlation coefficient generated during a first time interval and a second time correlation coefficient generated during a second time interval adjacent to the first time interval, and update the codebook according to the compared result.

The codebook updating unit may update the codebook in the case where the time correlation coefficient is changed. When the time correlation coefficient is unchanged, the radio channel state from the base station to the mobile station may be determined to be unchanged. In this case, the existing codebook may be used as is, thereby reducing a computation load of the mobile station.

The codebook updating unit may produce a ratio of the first time correlation coefficient to the second time correlation coefficient, compare the produced ratio and a predetermined threshold, and determine whether the time correlation coefficient is changed according to the compared result.

The transmission unit 140 may transmit the time correlation coefficient to the base station 200 only when the time correlation coefficient is changed. The base station 200 may update the codebook of the base station 200 based on the changed time correlation coefficient. When the time correlation coefficient is unchanged, the base station 200 may not update codebook of the base station. The time correlation coefficient may be transmitted from the mobile station 100 to the base station 200 only when the time correlation coefficient is changed, and thus effectively using a transmission path reaching from the mobile station 100 to the base station 200.

The transmission unit 140 may transmit the time correlation coefficient to the base station 200 only when the time correlation coefficient is greater than the predetermined threshold.

The codebook change unit 220 may generate a third codeword matrix with respect to each of a plurality of first codeword matrixes included in the first codebook, and generate the second codebook based on the generated third codeword matrix.

The codebook change unit 220 may generate the third codeword matrix based on the time correlation coefficient. The codebook change unit 220 may generate the third codeword matrix such that similarity between the first codeword matrix and the third codeword matrix is in proportion to a size of the time correlation each other.

According to an aspect, the codebook change unit 220 may generate the third codeword matrix according to $$\Theta'_i = \lfloor \rho \cdot I \sqrt{1-\rho^2} \cdot \Theta_i \rfloor, \quad \text{[Equation 3]}$$

wherein $\Theta'_i$ denotes an i-th third codeword matrix, and $\Theta_i$ denotes an i-th first codeword matrix. In the case where M transmission antennas are installed in the base station 200, I is an identity matrix having a size of M*M. M left-sided columns of the third codeword matrix are determined to correspond to each column of the identity matrix. The remaining columns of the third codeword matrix are determined to correspond to the first codeword matrix.

According to another aspect, the codebook change unit 220 may generate the third codeword matrix according to $$\Theta'_i = \rho \cdot I + \sqrt{1-\rho^2} \cdot \Theta_i, \quad \text{[Equation 4]}$$

wherein $\Theta'_i$ denotes an i-th third codeword matrix, and $\Theta_i$ denotes an i-th first codeword matrix. When M transmission antennas are installed in the base station 200, each of $\Theta'_i$ and $\Theta_i$ is a square matrix having a size of M*M. I denotes an identity matrix having a size of M*M.

The codebook updating unit 120 may generate a plurality of second codeword matrixes included in the second codebook based on a result of a singular value decomposition performed with respect to the third codeword matrix.

The codebook updating unit 120 may generate the second codeword matrix according to $$\tilde{\Theta}_i = U_i, \quad \text{[Equation 5]}$$

wherein $\tilde{\Theta}_i$ denotes an i-th second codeword matrix, and $U_i$ is determined by $$SVD[\Theta'_i] = U_i \cdot \Lambda_i \cdot V^*_i, \quad \text{[Equation 6]}$$

wherein SVD[x] denotes an operator performing a singular value decomposition operation with respect to a matrix of X, $U_i$ denotes a left singular vector with respect to $\Theta'_i$, $V_i$ denotes a right singular vector with respect to $\Theta'_i$, and $\Lambda_i$ denotes a diagonal matrix being composed of singular values of $\Theta'_i$.

According to another exemplary embodiment, the codebook updating unit 120 may generate the second codeword matrix based on a product of right singular vector and left singular vector with respect to the third codeword matrix. According to an aspect, the codebook updating unit 120 may generate the second codeword matrix according to $$\tilde{\Theta}_i = U_i \cdot V^*_i, \quad \text{[Equation 7]}$$

The second codeword matrixes satisfying the above Equation 7 are matrixes also satisfying the below Equation 8. Thus, according to another aspect, the codebook updating unit 120 may generate the second codeword matrix according to $$\tilde{\Theta}_i = \arg\min \|\Theta'_i - \tilde{\Theta}_i\|_F, \quad \text{[Equation 8]}$$

wherein $\|x\|_F$ denotes a Frobenius norm with respect to a matrix of x.

The codebook updating unit 120 may generate each of the plurality of second codeword matrixes included in the second codebook based on a reverse matrix of the third codeword matrix.

According to another aspect, the codebook updating unit 120 may generate the second codeword matrix according to $$\tilde{\Theta}_i = \Theta'_i \cdot [\Theta'^*_i \cdot \Theta'_i]^{-\frac{1}{2}}, \quad \text{[Equation 9]}$$

wherein $\tilde{\Theta}_i$ denotes an i-th second codeword matrix, and X* denotes a conjugate transpose matrix with respect to a matrix of x.

The codebook updating unit 120 may generate the second codebook based on the respective generated codeword matrixes. According to an aspect, the codebook updating unit 120 may generate the second codebook according to $$\{\tilde{\theta}\} = \{\tilde{\Theta}_1, \tilde{\Theta}_2, \ldots, \tilde{\Theta}_K\},\qquad \text{[Equation 10]}$$

wherein { } denotes a matrix set being composed of matrixes, $\tilde{\theta}$ denotes the second codebook, and K denotes a number of second codeword matrixes included in the second codebook.

Figure 3:
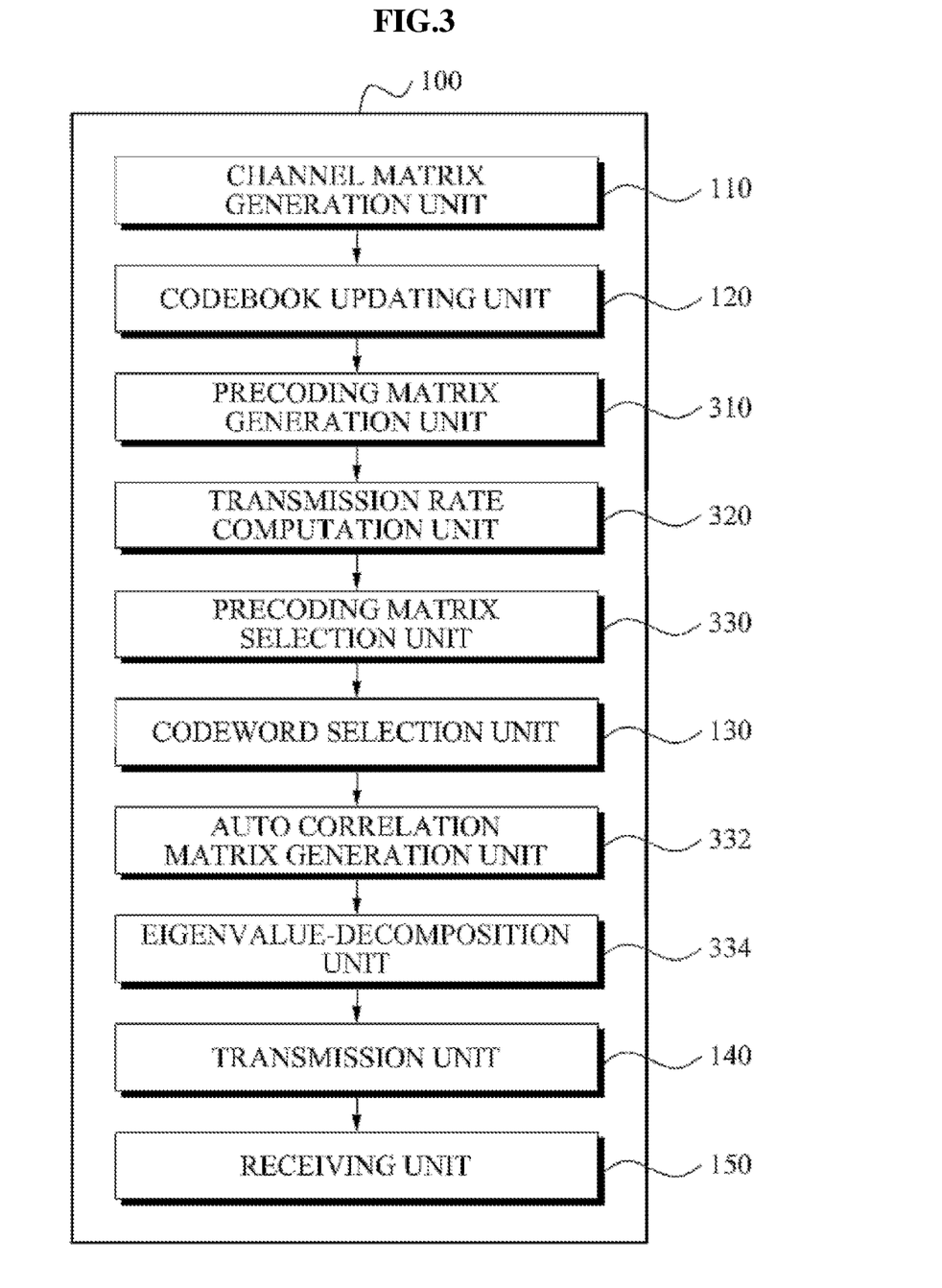
FIG. 3 is a block diagram illustrating a structure of a mobile station which updates a precoding matrix according to an exemplary embodiment.

FIG. 3 is a block diagram illustrating a structure of a mobile station 100 which updates a precoding matrix according to an exemplary embodiment. Operations of the mobile station according to an exemplary embodiment will be described with reference to FIG. 3. The mobile station 100 includes a codebook updating unit 120, a precoding matrix generation unit 310, a transmission rate computation unit 320, a precoding matrix selection unit 330, and a codeword selection unit 130.

The codebook updating unit 120 generates the second codeword matrix based on the first codeword matrix included in the first codebook, and also generates a second codebook based on the second codeword matrix.

The precoding matrix generation unit 310 generates a plurality of second precoding matrixes by multiplying a first precoding matrix associated with the base station by each of the plurality of second codeword matrixes.

The transmission rate computation unit 320 computes respective transmission rates when data is transmitted from the base station 200 to the mobile station 100 using each of the plurality of precoding matrixes.

The transmission rate computation unit 320 multiplies configuration components of respective precoding matrixes by virtual data transmitted via the transmission antenna of the base station 200. The transmission rate computation unit 320 may compute the transmission rate of the virtual data multiplied with the configuration components of the precoding matrix based on radio channels ranging from the base station 200 to the mobile station 100.

The precoding matrix selection unit 330 may select a second precoding matrix maximizing the transmission rate of the virtual data from among the plurality of precoding matrixes.

The precoding matrix selection unit 330 may compare the transmission rate of the virtual data and a transmission rate of predetermined threshold data, and select the second precoding matrix corresponding to at least the transmission rate of the predetermined threshold data.

The codeword selection unit 130 may select a transmission codeword matrix from among the second codeword matrixes based on the second precoding matrix selected by the preceding matrix selection unit 330.

The first preceding matrix may be generated based on the channel matrix.

According to an exemplary embodiment, an auto correlation matrix generation unit is further provided, which generates an auto correlation matrix associated with channels ranging from the base station 200 to the mobile station 100 based on the channel matrix.

According to an exemplary embodiment, an auto correlation matrix generation unit 332 is further provided, which generates an auto correlation matrix associated with channels ranging from the base station 200 to the mobile station 100 based on the channel matrix.

According to an exemplary embodiment, an eigenvalue decomposition unit 334 may be further provided, which performs an eigenvalue decomposition with respect to the auto correlation matrix. According to an aspect, the auto correlation matrix generation unit and the eigenvalue decomposition unit may generate and decompose the auto correlation matrix according to $$R_t = E[H^* \cdot H] = V_t \cdot \Sigma_t \cdot V_t^*,\qquad \text{[Equation 11]}$$

wherein $R_t$ denotes an auto correlation matrix associated with a channel, H denotes a channel matrix with respect to channels ranging from the base station 200 to the mobile station, E[X] denotes an operator adopting a time average with respect to a matrix of X, $V_t$ denotes a matrix being composed of eigenvectors of $R_t$, and $\Sigma_t$ denotes a diagonal matrix being composed of eigenvalues of $R_t$. When M transmission antennas are installed in the base station, each of $R_t$, $V_t$, and $\Sigma_t$ is a square matrix having a size of M*M. When N receiving antennas are installed in the mobile station, H denotes a matrix having a size of N*M.

The first precoding matrix may be determined according to a result of the eigenvalue decomposition performed with respect to the auto correlation matrix. The first precoding matrix may be determined as a dominant eigenvector from among a plurality of eigenvectors of the auto correlation matrix.

According to an exemplary embodiment, a precoding matrix updating unit may be further provided, which updates the first precoding matrix based on the second precoding matrix maximizing the data transmission rate. The precoding matrix updating unit may update the second precoding matrix maximizing the transmission rate to the first precoding matrix, and the precoding matrix generation unit 310 may generate the plurality of second precoding matrixes based on the updated first precoding matrix.

According to an exemplary embodiment, a candidate channel matrix generation unit may be further provided, which generates a plurality of candidate channel matrixes with respect to the first channel matrix by multiplying the second channel matrix generated by the channel matrix generation unit 110 by each of the plurality of second codeword matrixes.

According to an aspect, the candidate channel matrix generation unit may generate a candidate channel matrix according to $$\hat{h}_{\tau,i} = \tilde{\Theta} \times_i \cdot h_{\tau-1},\qquad \text{[Equation 12]}$$

wherein $\hat{h}_{\tau,i}$ denotes an i-th candidate channel matrix with respect to the first channel matrix, $h_{\tau-1}$ denotes a second channel matrix, and $\tilde{\Theta}_i$ denotes an i-th second codeword matrix.

The base station 100 may include M transmission antennas, and the mobile station 200 may include N receiving antennas. In this case, $h_{\tau-1}$ denotes a matrix having a size of M*N. When the mobile station 200 includes a single receiving antenna, $h_{\tau-1}$ denotes a vector having a size of M*1.

According to an exemplary embodiment, a candidate channel matrix selection unit may be further provided, which selects a candidate channel matrix having the smallest difference with the first channel matrix generated by the channel matrix generation unit 110 from among the plurality of candidate channel matrixes.

The codeword selection unit 130 may select the codeword matrix as the transmission codeword matrix based on the selected candidate channel matrix. According to an aspect, the codeword selection unit 130 may select the transmission codeword matrix according to $$\hat{\Theta} = \arg\min \sin^2(\angle(h_\tau, \hat{h}_{\tau,i})),\qquad \text{[Equation 13]}$$

wherein $\hat{\Theta}$ denotes a transmission codeword matrix, $\angle$ denotes an angle between two vectors on a vector space, $h_r$ denotes a first channel matrix, and $\hat{h}_{r,i}$ denotes an i-th candidate channel matrix. As can be seen in Equation 12, a codeword matrix corresponding to the candidate channel matrix having the smallest angle difference with the first channel matrix is selected as the transmission codeword matrix.

The first codeword matrixes included in the first codebook may be equally spaced in a matrix space.

Figure 4A:
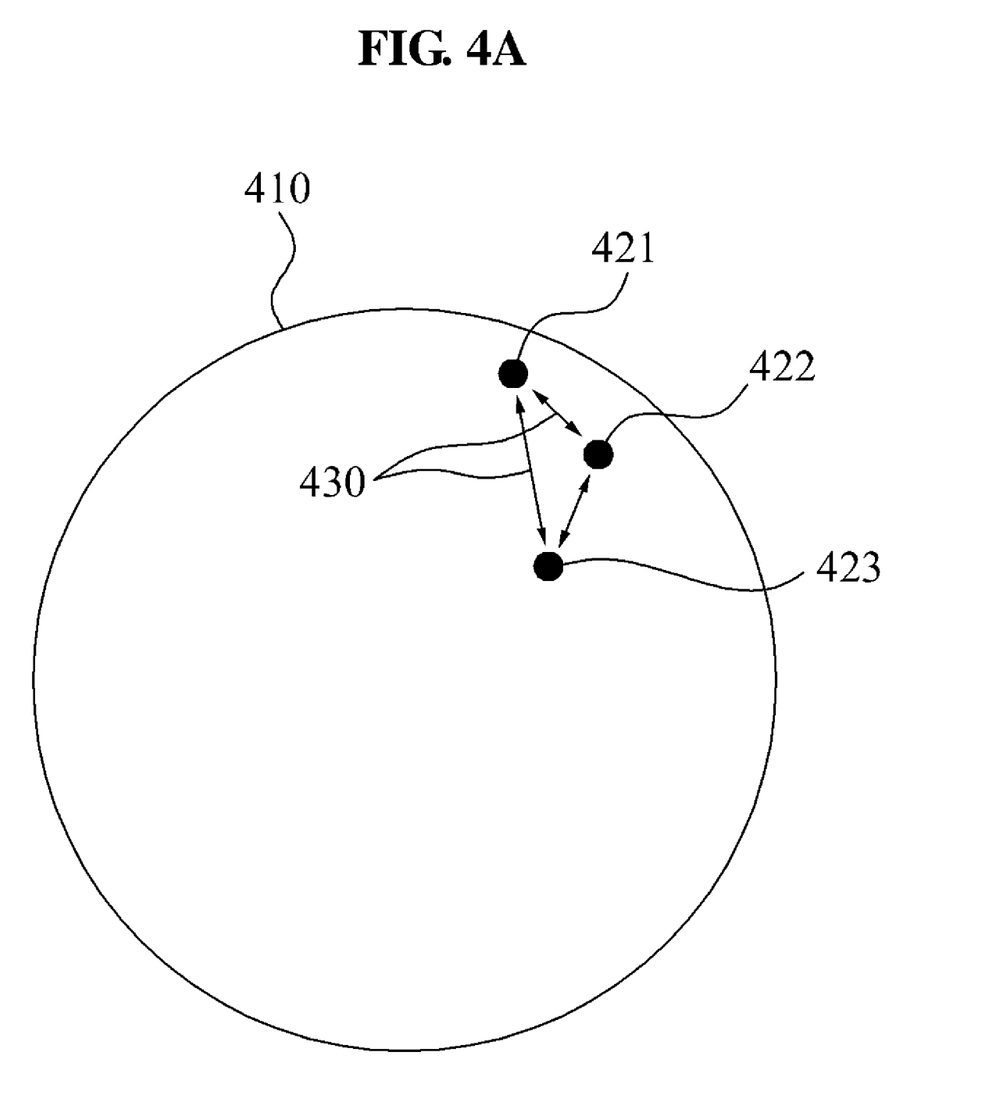
FIGS. 4A and 4B are conceptual diagrams illustrating a plurality of first codeword matrixes which are equally spaced in a matrix space according to an exemplary embodiment.
Figure 4B:
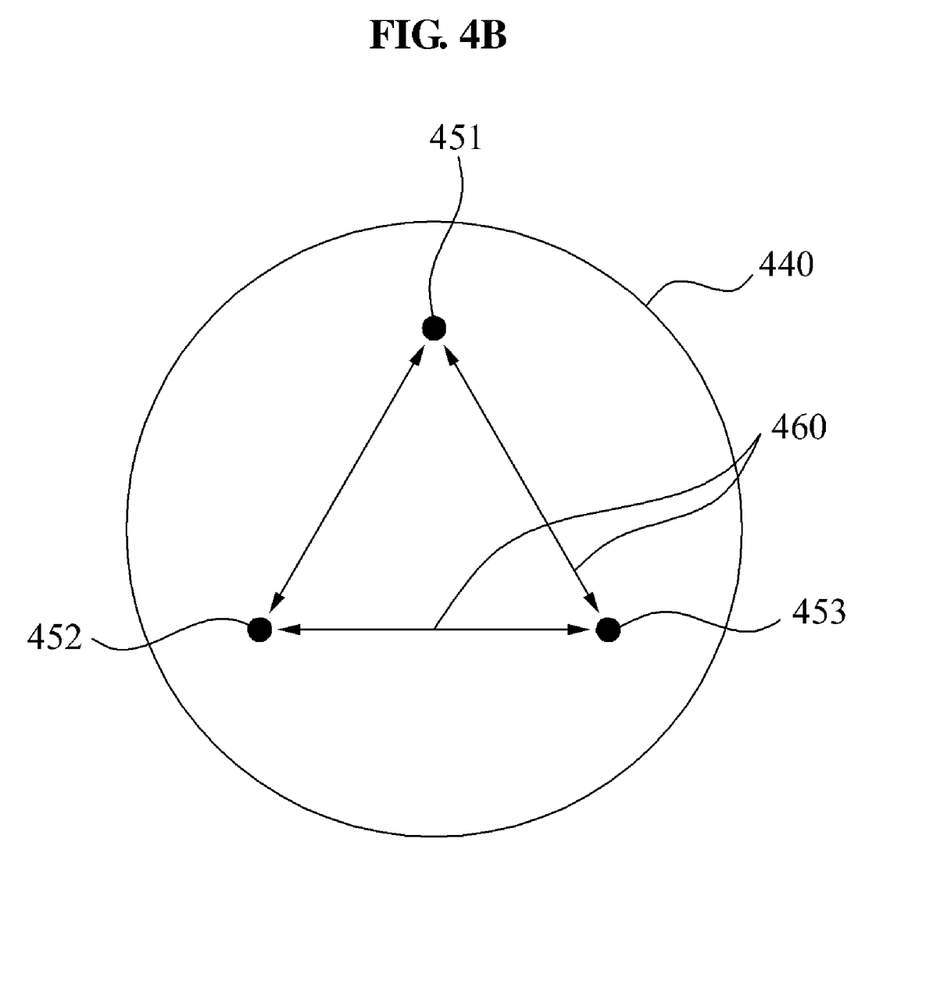

FIGS. 4A and 4B are conceptual diagrams illustrating a plurality of first codeword matrixes which are equally spaced in a matrix space according to an exemplary embodiment. Hereinafter, the plurality of first codeword matrixes equally spaced in the matrix space will be described with reference to FIGS. 4A and 4B.

FIG. 4A illustrates a state where a plurality of first codeword matrixes 421, 422, and 423 are unequally spaced in a matrix space 410. Each of the plurality of first codeword matrixes 421, 422, and 423 are spaced in a specific area of the matrix space 410. In this instance, respective distances 430 between the plurality of first codeword matrixes 421, 422, and 423 are significantly small.

FIG. 4B illustrates a state where another plurality of first codeword matrixes 451, 452, and 453 are equally spaced in a matrix space 440. Each of the plurality of first codeword matrixes 451, 452, and 453 are scatteredly spaced in the matrix space 440. In this instance, respective distances 460 between the plurality of first codeword matrixes 451, 452, and 453 are significantly great.

The first precoding matrix associated with the base station 200 is updated based on the second codeword matrixes 451, 452, and 453. When the second codeword matrixes 451, 452, and 453 are densely spaced only in a specific area of the matrix space 410 similar to FIG. 4A, the plurality of second precoding matrixes generated based on the second precoding matrix are similar to one another.

When the first precoding matrix is updated from among the plurality of second precoding matrixes being similar to one another, the first precoding matrix is selected by comparing only the second precoding matrixes positioned in the specific area of the matrix space 410. Accordingly, the updated first precoding matrix may not be a precoding matrix suitable for transmitting data by the base station 200.

Thus, the second preceding matrixes are required to be equally spaced in an entire area of the matrix space, and for this purpose, the first codeword matrixes are required to be equally spaced in the entire area of the matrix space.

According to an aspect, the first codeword matrixes may be generated based on a Discrete Fourier Transform (DFT) matrix according to $$\Theta_i = \Phi^i \cdot D, \quad \text{[Equation 14]}$$

wherein $\Theta_i$ denotes an i-th codeword matrix included in the first codebook, D denotes a DFT matrix, each column of which is a Fourier basis vector being orthogonal to each other, and $\Phi$ denotes a diagonal matrix determined by $$\Phi = \begin{bmatrix} e^{j\frac{2\pi m_1}{K}} & 0 & \cdots & 0 \\ 0 & e^{j\frac{2\pi m_2}{K}} & \cdots & 0 \\ \vdots & \vdots & \ddots & 0 \\ 0 & 0 & 0 & e^{j\frac{2\pi m_t}{K}} \end{bmatrix}, \quad \text{[Equation 15]}$$

wherein K denotes a number of codeword matrixes included in the first codebook, and $m_1, m_2, \ldots, m_t$ denote positive numbers arbitrarily selected between 1 to k.

According to an aspect, so that the first codeword matrixes included in the first codebook are equally spaced in the matrix space, the generated first codebook may be required to satisfy $$\{\theta\} = \arg\max_{\{\theta\} \subset U(M,M)} \min d(\Theta_i, \Theta_j), \quad \text{[Equation 16]}$$

wherein $\theta$ denotes a first codebook, $\Theta_i$, and $\Theta_j$ denote an i-th codeword matrix and j-th codeword matrix included in the first codebook, respectively, M denotes a number of transmission antennas installed in the base station, and U(M,M) denotes a unitary matrix having a size of M*M. A distance of d between two codeword matrixes may be determined by $$d(\Theta_i, \Theta_j) = \sqrt{1 - \frac{1}{M} \cdot |tr(\Theta_i^* \cdot \Theta_j)|}, \quad \text{[Equation 17]}$$

wherein X* denotes a conjugate transpose matrix with respect to a matrix of X.

According to another aspect, the first codeword matrixes may be generated by $$\Theta_i = \Phi^i, \quad \text{[Equation 18]}$$

wherein $\Theta_i$ denotes an i-th codeword matrix included in the first codebook, and $\Phi$ denotes a diagonal matrix determined by the above Equation 15.

Figure 5:
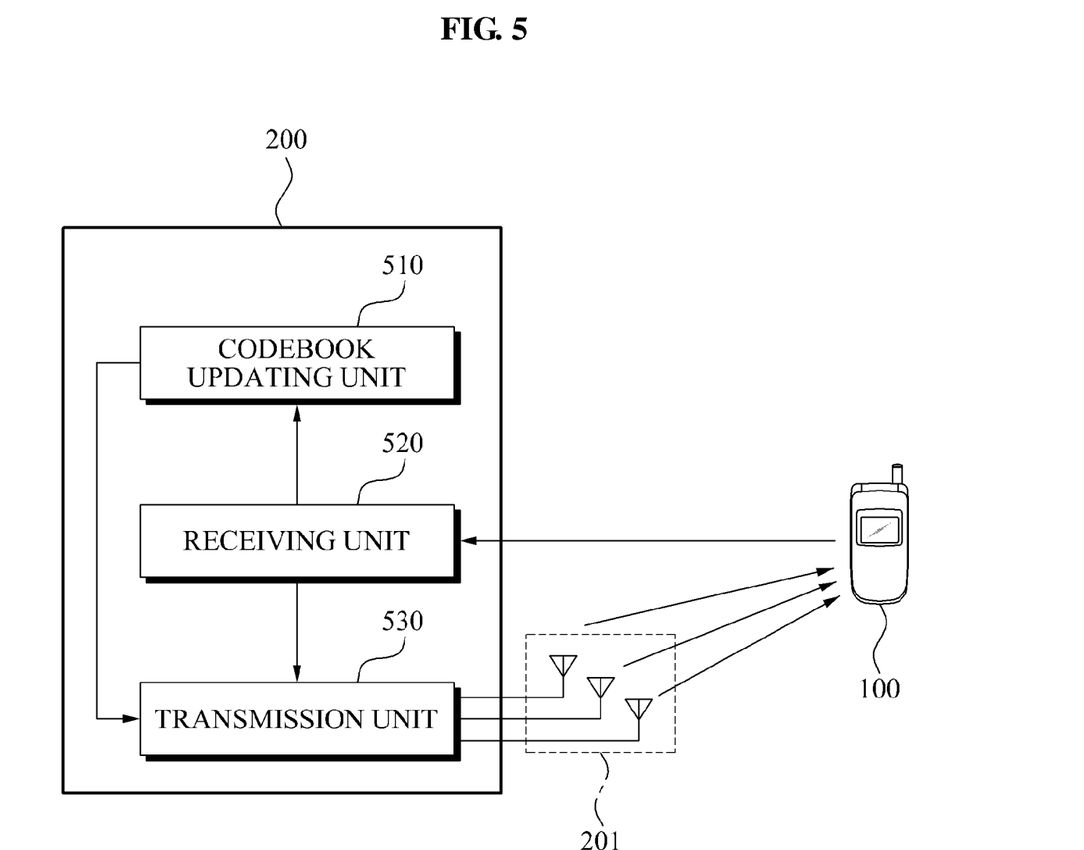
FIG. 5 is a block diagram illustrating a structure of a base station device which receives an index of a codeword matrix according to an exemplary embodiment.

FIG. 5 is a block diagram illustrating a structure of a base station device 200 which receives an index of a codeword matrix according to an exemplary embodiment. Hereinafter, operations of the base station device 200 according to an exemplary embodiment will be described with reference to FIG. 5. The base station device 200 includes a codebook updating unit 510, a receiving unit 520, and a transmission unit 530.

The transmission unit 530 transmits data to the mobile station 100 via the multiple transmission antennas 201.

The codebook updating unit 510 generates the second codebook based on the first codebook. The first codebook includes a plurality of first codeword matrixes, and the second codebook includes a plurality of second codeword matrixes. A number of first codeword matrixes and a number of second codeword matrixes are the same. The codebook updating unit 510 may generate each of the plurality of second codeword matrixes based on each of the plurality of first codeword matrixes, and also generate the second codebook including the generated second codeword matrixes. The codebook updating unit 510 may generate the second codebook based on the channel matrix with respect to channels ranging from the base station 200 to the mobile station 100.

The receiving unit 520 may receive, from the mobile station 100, information on at least one codeword matrix from among the plurality of second codeword matrixes. The information on the at least codeword matrix may be an index of the second codeword matrix selected by the mobile station 100.

The mobile station 100 and the base station 200 may include an identical second codebook. The second codebook of the mobile station 100 and the second codebook of the base station 200 are the same, and thus the mobile station does not transmit all information on the second codeword matrix selected by the mobile station 100, but transmits only an index of the selected second codeword matrix. The base station 200 may obtain all information on the second codeword matrix selected by the mobile station 100 only using the index transmitted by the mobile station 100.

The transmission unit 530 may transmit data to the mobile station 100 based on the second codeword matrix corresponding to the received index.

The transmission unit 530 may transmit a plurality of pilot signals to the mobile station 100 via each of the multiple transmission antennas, and the mobile station 100 may generate a channel matrix with respect to channels ranging from the base station 200 to the mobile station 100 based on the plurality of pilot signals. The mobile station 100 may transmit the channel matrix or information on the channel matrix to the base station 200.

The receiving unit 520 may receive the information on the channel matrix, and reconstruct the channel matrix with respect to the channels ranging from the base station 200 to the mobile station 100.

The receiving unit 520 may receive a time correlation coefficient with respect to the channel matrix. The mobile station 100 may generate the time correlation coefficient by comparing a first channel matrix generated at a specific time interval and a second channel matrix generated in a time interval adjacent to the specific time interval. In this instance, the time correlation coefficient may indicate occurrence/non-occurrence of change in the channel matrix over time. The receiving unit 520 may receive the time correlation coefficient from the mobile station 100, and the codebook updating unit 510 may generate the second codebook based on the time correlation coefficient.

Figure 6:
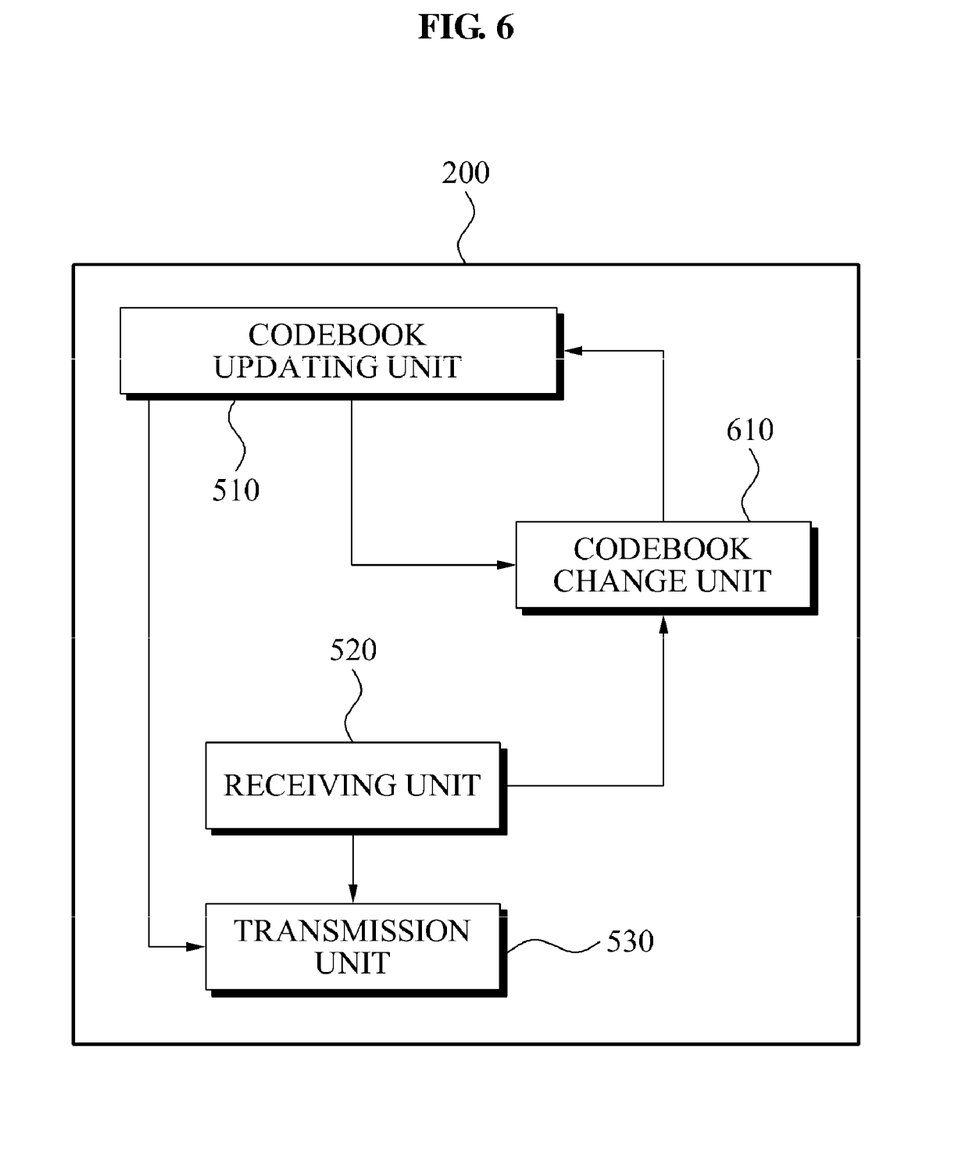
FIG. 6 is a block diagram illustrating a structure of a base station device which generates a third codeword matrix by transforming the first codeword matrix according to an exemplary embodiment.

FIG. 6 is a block diagram illustrating a structure of a base station device 200 which generates a third codeword matrix by transforming the first codeword matrix according to an exemplary embodiment. Hereinafter, operations of the base station device 200 will be described with reference to FIG. 6. The base station device 200 includes a codebook updating unit 510, a codebook change unit 610, a receiving unit 520, and a transmission unit 530.

The receiving unit 520 may receive, from the mobile station 100, a time correlation coefficient with respect to channels ranging from the base station 200 to the mobile station 100.

The codebook change unit 610 may generate a third codeword matrix with respect to each of the plurality of first codeword matrixes based on the time correlation coefficient received by the receiving unit 520 and an identity matrix.

According to an aspect, the codebook change unit 610 may generate the third codeword matrix according to $$\Theta'_i = \lfloor \rho \cdot I \sqrt{1-\rho^2} \cdot \Theta_i \rfloor,$$ [Equation 19]

wherein $\Theta_i'$ denotes an i-th third codeword matrix, and $\Theta_i$ denotes an i-th first codeword matrix. When M transmission antennas are installed in the base station 200, each of $\Theta_i'$ and $\Theta_i$ is a square matrix having a size of M*M. I denotes an identity matrix having a size of M*M. M left-sided columns of the third codeword matrix are determined to correspond to each column of the identity matrix. The remaining columns of the third codeword matrix are determined to correspond to the first codeword matrix.

According to another aspect, the codebook change unit 610 may generate the third codeword matrix according to $$\Theta'_i = \rho \cdot I + \sqrt{1-\rho^2} \cdot \Theta_i,$$ [Equation 20]

wherein $\Theta_i'$ denotes an i-th third codeword matrix, and $\Theta_i$ denotes an i-th first codeword matrix. When M transmission antennas are installed in the base station 200, each of $\Theta_i'$ and $\Theta_i$ is a square matrix having a size of M*M. I denotes an identity matrix having a size of M*M.

The codebook updating unit 510 generates the second codebook based on the channel matrix with respect to the channels ranging from the base station 200 to the mobile station 100 and the first codebook. The first codebook and the second codebook include a plurality of first codeword matrixes and a plurality of second codeword matrixes, respectively. In this instance, a number of first codeword matrixes and a number of second codeword matrixes are the same.

The codebook updating unit 510 may generate each of the plurality of second codeword matrixes based on a result of an eigenvalue decomposition performed with respect to each of the third codeword matrixes. According to an aspect, the codebook updating unit 510 may generate the second codeword matrix according to $$\tilde{\Theta}_i = U_i,$$ [Equation 21]

wherein $\tilde{\Theta}_i$ denotes an i-th second codeword matrix, and $U_i$ is determined by $$SVD[\Theta'_i] = U_i \cdot \Lambda_i \cdot V^*_i,$$ [Equation 22]

wherein SVD[x] denotes an operator performing a singular value decomposition operation with respect to a matrix of X, $U_i$ denotes a left singular vector with respect to $\Theta'_i$, $V_i$ denotes a right singular vector with respect to $\Theta'_i$, and $\Lambda_i$ denotes a diagonal matrix being composed of singular values of $\Theta'_i$.

According to another exemplary embodiment, the codebook updating unit 510 may generate the second codeword matrix based on a product of the right singular vector and left singular vector with respect to the third codeword matrix. According to an aspect, the codebook updating unit 510 may generate the second codeword matrix according to $$\tilde{\Theta}_i = U_i \cdot V^*_i,$$ [Equation 23]

The second codeword matrixes satisfying Equation 23 are matrixes satisfying the below Equation 24. As a result, according to another aspect, the codebook updating unit 510 may generate the second codeword matrixes according to $$\tilde{\Theta}_i = \arg\min \|\Theta'_i - \tilde{\Theta}_i\|_F,$$ [Equation 24]

wherein $\|x\|_F$ denotes a Frobenius norm with respect to a matrix of x.

According to another exemplary embodiment, the codebook updating unit 510 may generate each of the plurality of second codeword matrixes based on a reverse matrix of each of the third codeword matrixes. According to an aspect, the codebook updating unit 510 may generate the second codeword matrix according to $$\tilde{\Theta}_i = \Theta'_i \cdot [\Theta'^*_i \cdot \Theta'_i]^{-\frac{1}{2}},$$ [Equation 25]

wherein $\tilde{\Theta}_i$ denotes an i-th second codeword matrix, and X* denotes a conjugate transpose matrix with respect to a matrix of X.

The codebook updating unit 510 may generate the second codebook based on the respective generated codeword matrixes. According to an aspect, the codebook updating unit 510 may generate the second codebook according to $$\{\tilde{\theta}\} = \{\tilde{\Theta}_1, \tilde{\Theta}_2, \ldots, \tilde{\Theta}_K\},$$ [Equation 26]

wherein { } denotes a matrix set being composed of matrixes, $\tilde{\theta}$ denotes a second codebook, and K denotes a number of second codeword matrixes included in the second codebook.

The transmission unit 530 may transmit data to the mobile station 100 based on the second codeword matrix corresponding to the received index.

Figure 7:
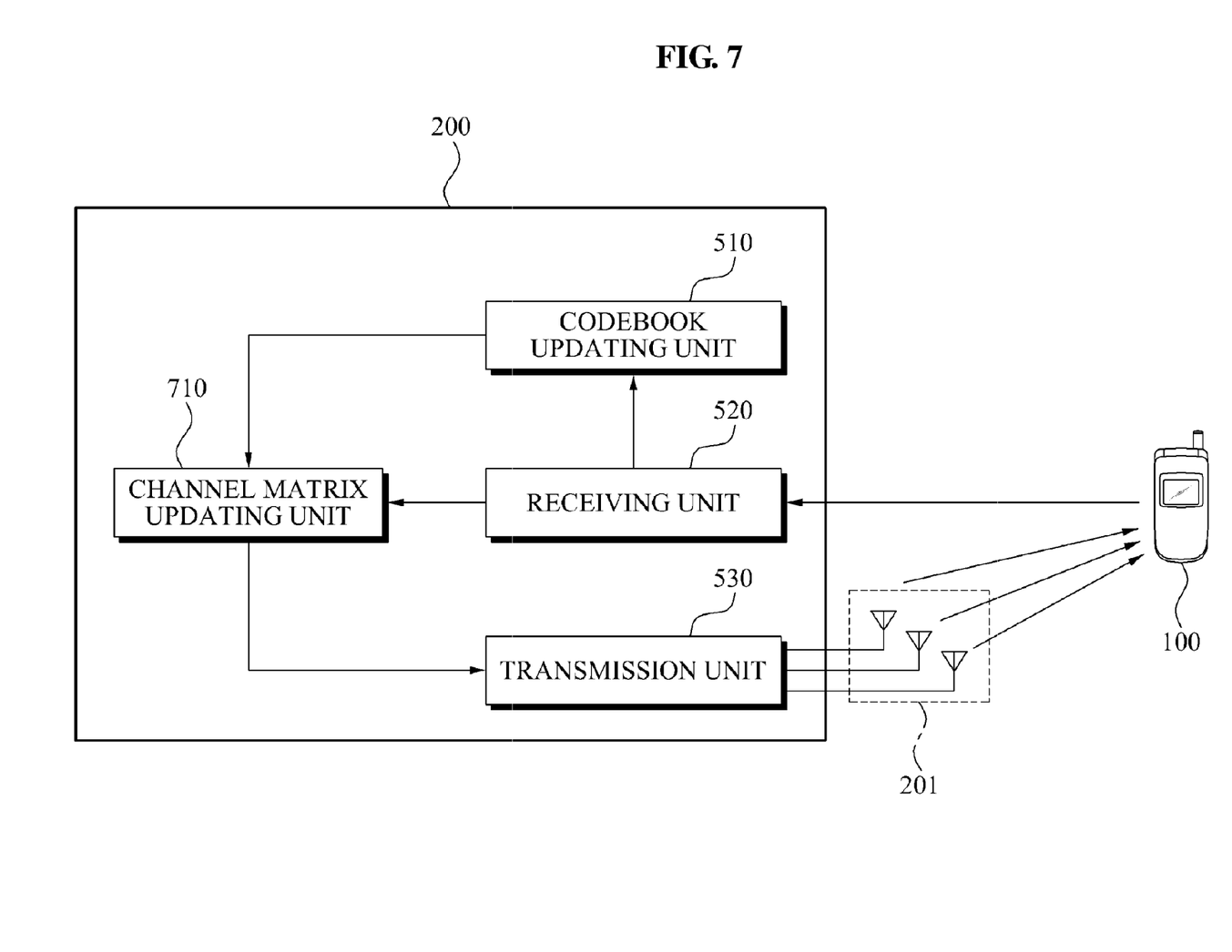
FIG. 7 is a block diagram illustrating a structure of a base station device which updates a channel matrix based on an index received from a mobile station according to an exemplary embodiment.

FIG. 7 is a block diagram illustrating a structure of a base station device 200 which updates a channel matrix based on an index received from the mobile station according to an exemplary embodiment. Hereinafter, operations of the base station device 200 according to an exemplary embodiment will be described with reference to FIG. 7. The base station device 200 includes a codebook updating unit 510, a receiving unit 520, a channel matrix updating unit 710, and a transmission unit 530.

The receiving unit 520 receives, from the mobile station 100, a channel vector with respect to channels ranging from the base station 200 to the mobile station 100, or information on the channel matrix.

It may be difficult for the base station 200 to collect information on the channels ranging from the base station 200 to the mobile station 100. When the mobile station 100 estimate a channel to generate information on a channel matrix and transmits the generated information on the channel matrix to the base station 200, this results in wasting bandwidth from the mobile station 100 to the base station 200 in order to transmit detailed information on the channel.

According to an aspect, the mobile station 100 is allowed to transmit only an index of the codeword matrix excluding a channel matrix with respect to the channels from the base station 200 to the mobile station 100. The base station 200 may receive only the index of the codeword matrix, and regenerate the same channel matrix as the channel matrix generated by the mobile station 100. The base station 200 may transmit data to the mobile station 100 based on the regenerated channel matrix. Since the mobile station 100 does not transmit an accurate channel matrix, but transmits the index of the codeword matrix, bandwidth from the mobile station 100 to the base station 200 may be saved.

The codebook updating unit 510 generates the second codebook based on information on the first codebook and the channel matrix. The first codebook includes a plurality of first codeword matrixes, and the second codebook includes a plurality of second codeword matrixes. A number of the plurality of first codeword matrixes and a number of the plurality of second codeword matrixes are the same.

The receiving unit 520 may receive an index of the second codeword matrix.

The channel matrix updating unit 710 updates the channel matrix with respect to the channels ranging from the base station 200 to the mobile station 100. The channel matrix updating unit 710 may update the channel matrix by multiplying the second codeword matrix, which corresponds to the index received by the receiving unit 520 from among the plurality of second codeword matrixes included in the second codebook, by the channel matrix.

According to an aspect, the channel matrix updating unit 710 may update the channel matrix with respect to the channels ranging from the base station 200 to the mobile station 100 according to $$\hat{h}_{i,\tau} = \tilde{\Theta}_i \hat{h}_{i,\tau-1},$$ [Equation 27]

wherein $\hat{h}_{i,\tau}$ denotes a channel matrix updated with respect to channels ranging from the base station 200 to an i-th mobile station, $\hat{h}_{i,\tau-1}$ denotes a channel matrix before being updated with respect to the channels ranging from the base station 200 to the i-th mobile station, and $\tilde{\Theta}_i$ denotes a second codeword matrix corresponding to an index transmitted by the i-th mobile station.

The transmission unit 530 may transmit data to the respective mobile stations based on the updated channel matrix. The transmission unit 530 may generate a preceding matrix based on the updated channel matrix, and multiply each element of the generated preceding matrix by data transmitted via the multiple transmission antennas 201.

According to an aspect, the transmission unit 530 may generate the preceding matrix according to $$W = \frac{\hat{W}}{\|\hat{W}\|^2},$$ [Equation 28]

wherein W denotes a preceding matrix, and $\hat{W}$ denotes a preceding matrix which is not normalized. In this instance, $\hat{W}$ may be determined by $$\hat{W} = \hat{H} \cdot (\hat{H}^* \cdot \hat{H})^{-1},$$ [Equation 29]

wherein $\hat{H}$ denotes a matrix being composed of a channel matrix with respect to channels from the base station to the respective mobile stations, which may be determined by $$\hat{H} = \lfloor \hat{h}_1 \ \ldots \ \hat{h}_L \rfloor,$$ [Equation 30]

wherein $\hat{h}_i$ denotes a channel matrix with respect to channels ranging from the base station 200 to an i-th mobile station connected with the base station 200, and L denotes a number of mobile stations connected with the base station 200.

According to another exemplary embodiment, the transmission unit 530 may transmit data to the mobile station 100 based on the second codeword matrix included in the second codebook. The transmission unit 530 may update the precoding matrix based on the second codeword matrix corresponding to the index received by the receiving unit 520. The precoding matrix may be updated by multiplying the second codeword matrix corresponding to the received index by the precoding matrix.

The transmission unit 530 may multiply each element of the updated precoding matrix by data transmitted via the multiple transmission antennas 201, respectively, and transmit the multiplied data to the mobile station 100.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to include hardware only or hardware and one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile station comprising:
a channel matrix generation unit configured to generate a channel matrix with respect to channels ranging from a base station to a mobile station, the base station including multiple transmission antennas;
a codebook updating unit configured to generate a second codebook including a plurality of second codeword matrixes based on 1) the generated channel matrix and 2) a first codebook including a plurality of first codeword matrixes;
a codeword selection unit configured to select at least one transmission codeword matrix from among the plurality of second codeword matrixes;
a transmission unit configured to transmit an index of the selected transmission codeword matrix to the base station; and
a receiving unit configured to receive data transmitted from the base station via the multiple transmission antennas based on the transmitted index, wherein the channel matrix generation unit, the codebook updating unit, the codeword selection unit, the transmission unit, the receiving unit or any combination thereof is implemented by hardware.

2. The mobile station of claim 1, wherein the channel matrix generation unit generates the channel matrix for each time interval having a predetermined length, and the mobile station further comprises:
a time correlation coefficient-generation unit configured to generate a time correlation coefficient by comparing a first channel matrix generated in a specific time interval and a second channel matrix generated in another time interval adjacent to the specific time interval,
wherein the codebook updating unit generates the second codebook based on the time correlation coefficient.

3. The mobile station of claim 2, wherein the transmission unit transmits the generated time correlation coefficient to the base station, and the receiving unit receives the data transmitted from the base station according to the transmitted time correlation coefficient.

4. The mobile station of claim 2, wherein the codebook updating unit generates a first time correlation coefficient during the specific time interval and a second time correlation coefficient during a time interval adjacent to the specific time interval, and generates the second codebook based on a compared result between the first and second time correlation coefficients.

5. The mobile station of claim 2, further comprising:
a codebook change unit configured to generate a third codeword matrix with respect to each of the plurality of first codeword matrixes based on the time correlation coefficient and an identity matrix,
wherein the codebook updating unit generates the second codeword matrix based on a singular value decomposition result with respect to the third codeword matrix.

6. The mobile station of claim 2, further comprising:
a codebook change unit configured to generate a third codeword matrix with respect to each of the plurality of first codeword matrixes based on the time correlation coefficient and an identity matrix,
wherein the codebook updating unit generates the plurality of second codeword matrixes based on a reverse matrix of the third codeword matrix.

7. The mobile station of claim 1, further comprising:
a precoding matrix-generation unit configured to generate a plurality of second precoding matrixes by multiplying a first precoding matrix associated with the base station by each of the plurality of second codeword matrixes,
wherein the codeword selection unit selects the transmission codeword matrix based on the generated second precoding matrixes.

8. The mobile station of claim 7, further comprising:
an auto correlation matrix generation unit configured to generate an auto-correlation matrix associated with the channel based on the channel matrix; and
an eigenvalue-decomposition unit configured to perform an eigenvalue decomposition with respect to the auto-correlation matrix,
wherein the first precoding matrix is determined based on a result of the eigenvalue decomposition performed with respect to the auto-correlation matrix.

9. The mobile station of claim 7, further comprising:
a transmission rate computation unit configured to compute a transmission rate of data transmitted to the mobile station via the multiple transmission antennas with respect to each of the plurality of second precoding matrixes,
wherein the codeword selection unit selects the transmission codeword matrix based on the second precoding matrix maximizing the transmission rate.

10. The mobile station of claim 9, further comprising:
a precoding matrix updating unit configured to update the first precoding matrix based on the second precoding matrix maximizing the transmission rate.

11. The mobile station of claim 2, further comprising:
a candidate channel matrix generation unit configured to generate a plurality of candidate channel matrixes by multiplying the second channel matrix by each of the plurality of second codeword matrixes; and
a candidate channel vector-selection unit configured to select a candidate channel matrix having the smallest difference with the first channel matrix,
wherein the codeword selection unit selects the transmission codeword matrix based on the selected candidate channel matrix.

12. The mobile station of claim 1, wherein the first codeword matrixes are equally spaced in a matrix space.

13. A base station device, comprising:
a transmission unit to include multiple transmission antennas;
a codebook updating unit to generate a second codebook including a plurality of second codeword matrixes based on 1) a channel matrix with respect to channels ranging from the multiple transmission antennas to a mobile station connected with the base station and 2) a first codebook including a plurality of first codeword matrixes;

a receiving unit to receive, from the mobile station, an index of at least one codeword matrix from among the plurality of second codeword matrixes; and a transmission unit to transmit data to the mobile station via the multiple transmission antennas based on the second codeword matrix corresponding to the received index.

14. The base station device of claim 13, wherein the transmission unit transmits a plurality of pilot signals to the mobile station via each of the multiple transmission antennas, and the channel matrix is generated based on the pilot signal.

15. The base station device of claim 13, wherein the receiving unit receives, from the mobile station, a time correlation coefficient related with occurrence/nonoccurrence of a change in the channel matrix.

16. The base station device of claim 15, further comprising:
a codebook change unit to generate a third codeword matrix with respect to each of the plurality of first codeword matrixes based on the time correlation coefficient and an identity matrix,
wherein the codebook updating unit generates the second codeword matrix based on a result of a singular value decomposition performed with respect to the third codeword matrix.

17. The base station device of claim 15, further comprising:
a codebook change unit to generate a third codeword matrix with respect to each of the plurality of first codeword matrixes based on the time correlation coefficient and an identity matrix,
wherein the codebook updating unit generates the second codeword matrix based on a reverse matrix of the third codeword matrix.

18. The base station device of claim 13, further comprising:
a channel matrix updating unit to update the channel matrix by multiplying the channel matrix and the second codeword matrix corresponding to the received index, wherein the transmission unit transmits data to the mobile station based on the updated channel matrix.

* * * * *